Sept. 4, 1951   J. H. GRISWOLD   2,566,447
TIDE POWER GENERATOR

Filed June 28, 1948   2 Sheets-Sheet 1

JAMES H. GRISWOLD,
INVENTOR.

BY Hazard & Miller
ATTORNEYS

Sept. 4, 1951  J. H. GRISWOLD  2,566,447
TIDE POWER GENERATOR
Filed June 28, 1948  2 Sheets-Sheet 2
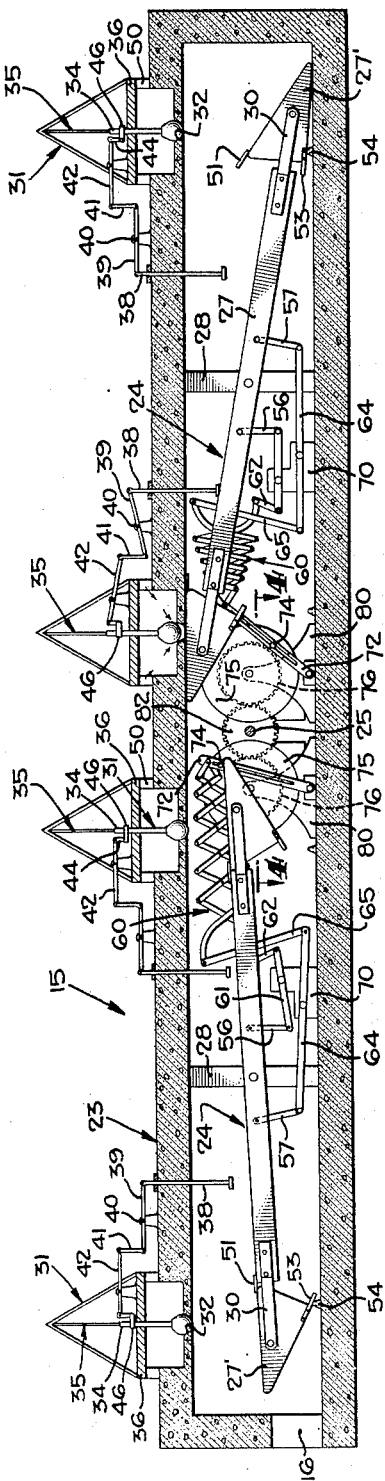
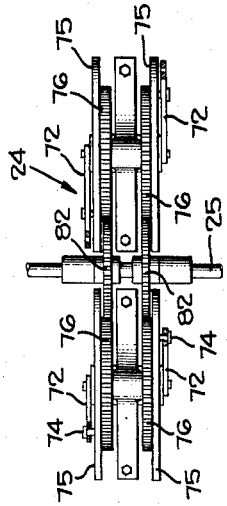
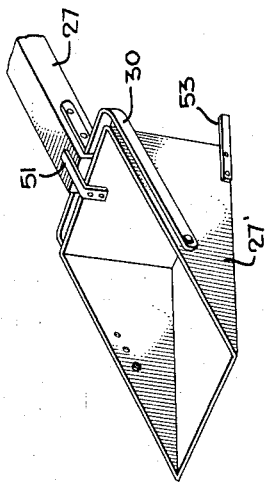
JAMES H. GRISWOLD,
INVENTOR.
BY
Hazard & Miller
ATTORNEYS Patented Sept. 4, 1951

2,566,447

UNITED STATES PATENT OFFICE 2,566,447

TIDE POWER GENERATOR

James H. Griswold, Redondo Beach, Calif.

Application June 28, 1948, Serial No. 35,663

5 Claims. (Cl. 253—4)

This invention relates to a system and apparatus for obtaining or generating power or energy from a body of tide water and specifically to such a system and apparatus for so utilizing the body of tide water that the system and apparatus can be operated continuously.

A main object of this invention is to provide a system for obtaining energy from a body of tide water by collecting water at high tide, storing the water, using the water in an apparatus for converting the potential energy of the water into mechanical energy, collecting the water used by the apparatus and storing it to release the water at low tide.

Another object of this invention is to provide an apparatus adapted to be associated with a body of water at one level and to transport the water to a lower level to convert the potential energy of the water into mechanical energy comprising a plurality of pivotally mounted beams, each beam having a bucket on each end thereof, and means associated with the body of water and actuated by the beams for filling the buckets of each beam in alternate fashion to cause the beams to oscillate, the device having a main power shaft and means connecting the main power shaft to the oscillating beams for converting the oscillating movement of the beams into rotative movement to rotate the main power shaft.

Another object of this invention is to provide a system for obtaining mechanical power from a body of tide water comprising a reservoir for storing high tide water from one high tide period to the next high tide period, apparatus associated with the reservoir and adapted to allow water from the reservoir to move downwardly therethrough to operate the apparatus to convert the potential energy of the water moving therethrough into mechanical energy, and a reservoir for receiving water from the apparatus and storing water from one low tide period to the next low tide period.

With the foregoing and other objects in view, which will be made manifest in the following detailed description and specifically pointed out in the appended claims, reference is had to the accompanying drawings for an illustrative embodiment of the invention, wherein:

Fig. 1 discloses a perspective view of the system of the present invention showing in dot dash lines a preferred location of the apparatus for using the water;

Fig. 3 is an enlarged sectional view along lines 3—3 of Fig. 2;

Fig. 4 is a sectional view along lines 4—4 of Fig. 3; and

Fig. 5 is an enlarged perspective view of one of the buckets of the apparatus.

Figure 1:
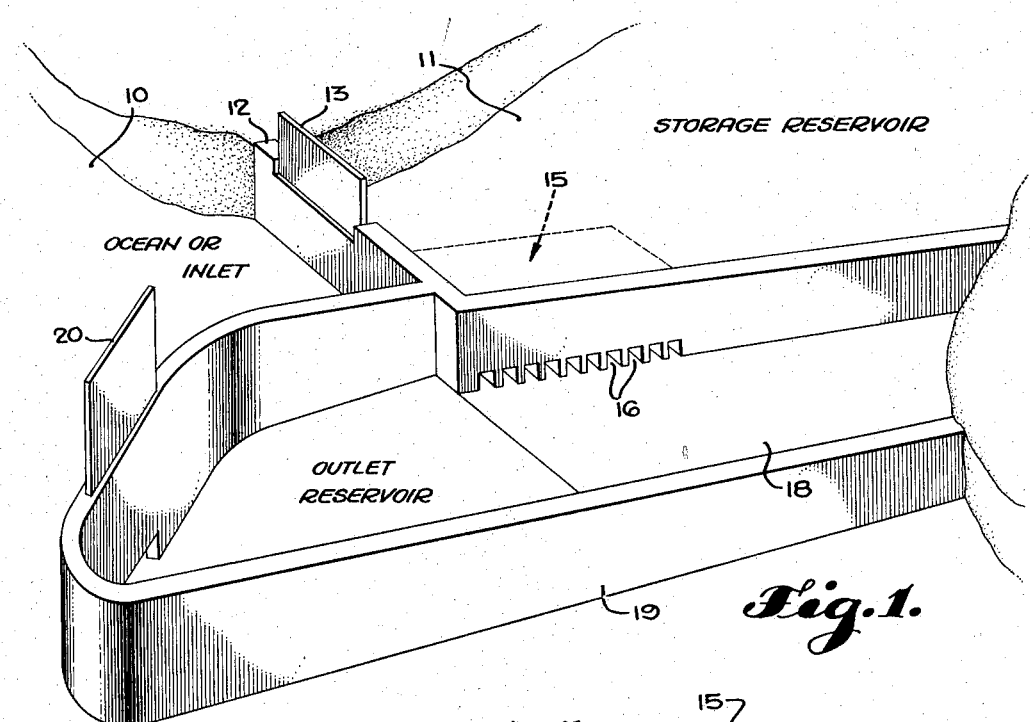
Figure 2:
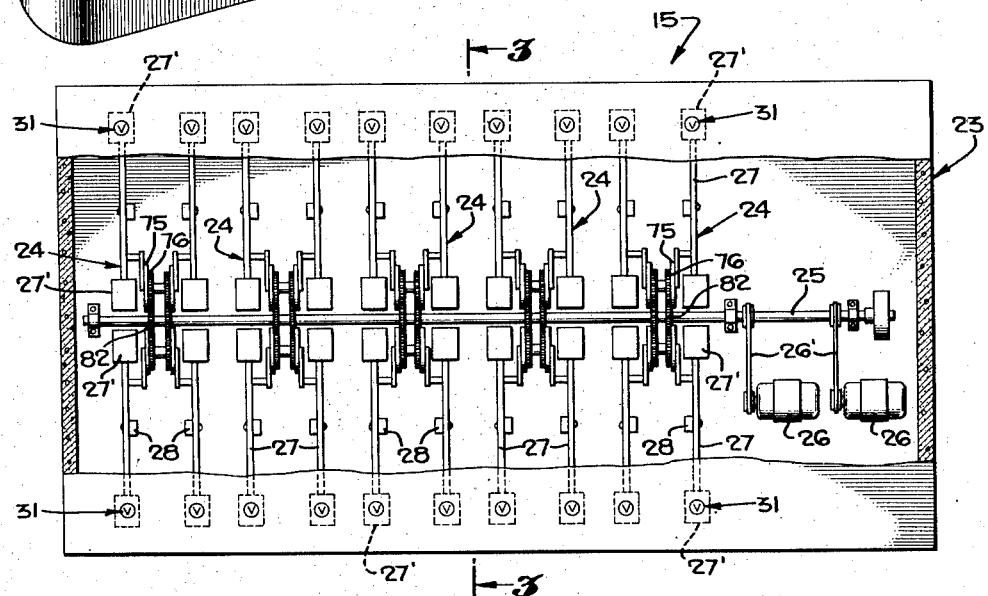
Fig. 2 is a plan view of the apparatus for using the water to convert the potential energy of the water into mechanical energy.

Referring to the accompanying drawings wherein similar reference characters designate similar parts throughout, the system is generally shown in Fig. 1 wherein reference numeral 10 indicates a body of tide water which may be the ocean or an inlet connected to the ocean. Reference numeral 11 represents a storage reservoir for storing high tide water and this storage reservoir may be formed in any suitable manner either by taking advantage of the site at which the system is to be located or the storage reservoir may be altogether manually built. However, it will be appreciated that the storage reservoir can be more inexpensively designed by taking advantage of the natural contours of the land where the system is to be installed. The storage reservoir 11 shown in Fig. 1 is illustrative only and is separated from the body of tide water by a dam generally indicated at 12, said dam having means which may take the form of a gate 13 for allowing high tide water to enter the storage reservoir 11. An apparatus generally indicated at 15 is preferably submerged or at least partially submerged in the storage reservoir and serves to convert the potential energy of part of the water in the storage reservoir into mechanical energy which process lowers the part of the water used, this water exiting through outlets 16 into an outlet reservoir generally indicated at 18 which outlet reservoir may be formed by walls 19, as shown in Fig. 2, or the walls 19 may be practically eliminated if the contour of the land into which the system is installed is favorable to the installation of the outlet reservoir. In any event, the outlet reservoir will have communication with the body of tide water 10 through a gate 20 which gate may take any suitable form and the form shown is only for illustrative purposes.

The system is operated briefly as follows. At or near high tide, the gate 13 is raised, the gate 20 being in its downward position closing the outlet reservoir, the opening of the gate 13 allowing high tide water to enter the storage reservoir and the storage reservoir is made large enough so that the amount of water used by the apparatus 15 will be such that the apparatus 15 can be operated continuously, that is, there will be enough water in the storage reservoir so that the apparatus 15 will operate from one high tide period to the next high tide period without the level of water in the storage reservoir falling below a predetermined minimum which minimum is so set that the apparatus will move continuously without ever stopping, therefore, generating power continuously. A part of the potential energy of the water in the storage reservoir is utilized in apparatus 15 and converted into mechanical energy the water being lowered and this water will be stored in the outlet reservoir 18 until low tide period occurs at which time the gate 20 will be raised and the water within the outlet reservoir will flow into the body of tide water after which the gate 20 will be lowered until the next low tide period. So it will be seen then, that the apparatus 13 is raised only during high tide period and remains closed between intervals of high tides and that the gate 20 is opened only during low tide and remains closed between the intervals of low tides.

The apparatus 15 for converting the potential energy of water into mechanical energy is shown in a plan view in Fig. 2 where the apparatus comprises a casing 23 of any suitable form which houses a plurality of sets of energy generating units 24, these units supplying power to a main power shaft 25 which may be adapted to run generators 26 through belts 26', though it is understood that the energy from main power shaft 25 may be used in any desired manner.

The mechanism for converting the potential energy of the water into mechanical energy is best shown in Fig. 3 and two of the mechanisms provide a unit 24, the mechanisms being in side by side relationship in Fig. 3 showing two mechanisms in different positions.

Each mechanism comprises an oscillatively mounted beam 27 which may be supported by a support 28, said beam having a bucket 27' swingably mounted by means of a clevis 30 on each end thereof. These buckets are adapted to receive water through a valve 31 which sits on a seat 32 which may be provided within casing 23 or which seat may be an insert whichever is desired. Valve 31 has a stem 34 extending therefrom, said stem being guided by a guide rod system generally indicated at 35 which is mounted on a table 36 which is provided on casing 23.

Means are provided for actuating the valve 31 when one end of the beam swings upwardly and these means comprise an actuating rod 38 which is pivoted to a lever 39, said lever being pivoted on a support 40 and lever 39 is also pivoted to an intermediate lever 41 which is in turn pivoted to an operating lever 42, said operating lever being pivotally mounted on table 36 and having a link 44 pivoted on the opposite end thereof which link pivots on a clamping member 46 which clamps about the stem 34. So, with reference to the right hand valve mechanism in Fig. 3, it will be seen that when the right hand end of beam 27 moves in an upward direction that it will contact the actuating rod 38 and swing lever 39 in a clockwise direction causing operating lever 42 to swing in a counterclockwise direction thereby raising the stem 34 and valve 31 from its seat 32 and allowing water to flow into bucket 27' when the bucket is in its uppermost position. It is preferable that the valve mechanism be so arranged that the valve is unseated just prior to the time that the bucket 27' reaches its uppermost position and valve 31 will again be seated by its own weight when the right hand end of beam 27 swings downwardly due to the weight of the water in bucket 27'.

The table 36 may have legs 50 supporting it from the casing 23, said legs providing ports into which the water may flow so as to pass through and into the buckets 27'.

Each bucket is provided with a stop 51 on the back thereof which stop engages the end of the beam 27 to which it is attached and prevents said bucket from swinging in the wrong direction. Each bucket 27' is also equipped with an actuating member 53 which may be fastened thereto by any suitable means, said actuating member engaging a stop 54 provided on the floor of casing 23 so that each of the buckets 27' is tilted into emptying position when the end of the arm to which it is attached swings in its downward position. It will be seen, therefore, that the beam 27 oscillates with the buckets 27' on the opposite ends thereof being filled in alternate fashion and emptied in alternate fashion so that power is generated which can be taken off of beam 27 by power links 56 and 57 which are disposed oppositely of support 28. These power links are connected to a lazy tong generally entitled 60, link 56 being connected by means of levers 61 and 62 and link 57 by levers 64 and 65, levers 61 and 64 being pivotally mounted on a standard 70 which is mounted on the floor of casing 23. The lazy tong 60 has its end portions mounted on a crank 72 which crank is pivoted at its lower end by any suitable means to the casing 23 and is provided with a longitudinal slot down the center thereof which slot engages a driving pin 74. This driving pin is fixedly mounted on a driving disc 75, said driving disc having a driving gear 76 fastened thereto, both the driving gear and driving disc being rotatably mounted by means of standards 80 on the floor of casing 23. Oppositely disposed driving gears 76 mesh with a center power gear 82 which is fixedly mounted on main power shaft 25 so that the driving gears 76 transfer their energy to the main shaft 25. The transfer of motion from oscillating beam 27 to the main shaft 25 takes place as follows. Upon oscillation of beam 27, the links 56 and 57 and their levers 61, 64, 62 and 65 are so moved that the lazy tong 60 is retracted when the inner end of the beams 27 are in their upward position and while the inner bucket of each beam is being filled and when the beam is forced downwardly by the filled bucket the lazy tongs 60 are expanded to the position shown in the left hand mechanism in Fig. 3, this movement oscillating the crank 72 back and forth which oscillation forces the pins 74 to slide backwards and forwards along the slot in crank 72 thereby rotating driving discs 75, gears 76 and 82 thereby driving main shaft 25.

It is preferred that the plurality of units 24 for converting the potential energy into mechanical energy be out of phase with one another so that there will be no dead center action of the cranks 72 and pins 74.

Throughout the specification and in the claims the apparatus and system will be described as converting the potential energy of the water into mechanical energy it being understood, of course, that this mechanical energy in the form of the invention disclosed is also converted into electrical energy but in any event the potential energy of the water is first converted into mechanical energy and then later converted into other forms of energy.

The water emptied from the buckets 28 may be allowed to flow onto the floor of the casing 23 and out through the outlets 16 and it may be desired to provide a cellar below the floor of the casing 23 into which the buckets may be emptied but in either case the operation of the device is substantially the same.

It is obvious that the system and apparatus of the present invention can be used to generate unlimited power, depending only on the size of the system and apparatus to be used, it being also obvious that as many converting units 24 as is desired can be used. As an example as how the above device could be used with a six foot tide, the storage reservoir would be designed so that the lever therein never fell below five feet and the buckets 28 would lower the water from five feet down to one foot and the outlet reservoir 18 would be designed so that during the period between low tides the level of the water in the outlet reservoir would never rise above one foot. Therefore, each of the reservoirs will serve during intervals between tides to store the proper amount of water to enable the apparatus 15 to operate continuously.

In Fig. 3, the casing 23 would be submerged in the storage reservoir, as shown, but if desired troughs or sluiceways can be provided which would hold approximately one foot of water.

It will be appreciated that by mounting drive wheels 75 in dual fashion on the same standard 80 that economy in the cost of manufacturing units 24 is obtained.

Since the device operates in a very even and steady fashion, the depreciation of the apparatus disclosed in the apparatus is practically nothing and the apparatus would require practically no attention and would, of course, operate continuously without interruption and could be used to supply the power for cities or power plants or the like.

Various changes may be made in the details of construction without departing from the spirit and scope of the invention as defined by the appended claims.

I claim:

1. A device of the class described adapted to be associated with a body of water at one level and to transport a part of the water to a lower level to convert the potential energy of the water into mechanical energy, comprising a plurality of oscillatively mounted beams, each beam having a bucket on each end thereof, means associated with a body of water and actuated by the beams for filling the buckets of each beam in alternate fashion to cause the beams to oscillate, a main power shaft, lazy tongs, linkage means connected to the beams for actuating the lazy tongs upon oscillation of the beams, and means connecting the lazy tongs to the main power shaft for rotating the main power shaft upon actuation of the lazy tongs.

2. A device of the class described adapted to be associated with a body of water at one level and to transport a part of the water to a lower level to convert the potential energy of the water into mechanical energy comprising a plurality of oscillatably mounted beams, each beam having a bucket on each end thereof, means actuated by the beams and adapted to be associated with a body of water for filling the buckets of each beam in alternate fashion to cause the beams to oscillate, means for causing buckets to be emptied as each bucket reaches its lowermost position, a main power shaft, lazy tongs, linkage means connected to beams for actuating the lazy tongs upon oscillation of the beams, and means connecting the lazy tongs to the main power shaft for rotating the main power shaft upon actuation of the lazy tongs.

3. A device of the class described adapted to be associated with a body of water at one level and to transport a part of the water to a lower level to convert the potential energy of the water into mechanical energy comprising a plurality of oscillatably mounted beams, each beam having a pivotally mounted bucket on each end thereof, means actuated by the beams and adapted to be associated with a body of water for filling the buckets of each beam in alternate fashion to cause the beams to oscillate, means for causing the buckets to be emptied as each bucket reaches its lowermost position, a main power shaft, lazy tongs, linkage means connected to the beams for actuating the lazy tongs upon oscillation of the beams, and means connecting the lazy tongs to the main power shaft for rotating the main power shaft upon actuation of the lazy tongs.

4. A device of the class described adapted to be associated with a body of water at one level and to transport a part of the water to a lower level to convert the potential energy of the water into mechanical energy comprising a plurality of oscillatably mounted beams, each beam having a pivotally mounted bucket on each end thereof, means actuated by the beams and adapted to be associated with a body of water for filling the buckets of each beam in alternate fashion to cause the beams to oscillate, means for tilting each bucket as it reaches its lowermost position to cause each bucket to be emptied, a main power shaft, lazy tongs, linkage means connected to the beam for actuating the lazy tongs upon oscillation of the beams, and means connecting the lazy tongs to the main power shaft for rotating the main power shaft upon actuation of the lazy tongs.

5. A device of the class described adapted to be associated with a body of water at one level and to transport a part of the water to a lower level to convert the potential energy of the water into mechanical energy comprising a plurality of oscillatably mounted beams, each beam having a pivotally mounted bucket on each end thereof, means actuated by the beams and adapted to be associated with a body of water for filling the buckets of each beam in alternate fashion to cause the beams to oscillate, means for tilting each bucket as it reaches its lowermost position to cause each bucket to be emptied, means for limiting movement of the buckets in one direction of tilt thereof, a main power shaft, lazy tongs, linkage means connected to the beams for actuating the lazy tongs upon oscillation of the beams, and means connecting the lazy tongs to the main power shaft for rotating the main power shaft upon actuation of the lazy tongs.

JAMES H. GRISWOLD.

REFERENCES CITED

The following references are of record in the file of this patent:

UNITED STATES PATENTS

| Number | Name | Date |
|---|---|---|
| 839,860 | Lemyre | Jan. 1, 1907 |
| 969,967 | MacDonald | Sept. 13, 1910 |
| 1,012,075 | Hall | Dec. 19, 1911 |
| 1,260,204 | Keithly | Mar. 19, 1918 |
| 1,459,645 | Wilson | June 19, 1923 |